US 6,580,988 B2

(12) United States Patent
Lin et al.

(10) Patent No.: US 6,580,988 B2
(45) Date of Patent: Jun. 17, 2003

(54) REAR WHEEL STEERING CONTROL

(75) Inventors: William Chin-Woei Lin, Troy, MI (US); Yuen-Kwok Chin, Troy, MI (US); Weiwen Deng, Sterling Heights, MI (US); Scott P. Sherman, Fenton, MI (US); Paul A. Grougan, Novi, MI (US); Eugene A. Rodden, Gilbert, AZ (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/992,505

(22) Filed: Nov. 6, 2001

(65) Prior Publication Data

US 2003/0088350 A1 May 8, 2003

(51) Int. Cl.[7] ................................................. B62D 5/04
(52) U.S. Cl. ........................... 701/41; 180/443; 180/445
(58) Field of Search .............................. 701/41, 42, 43; 180/408, 413, 414, 415, 422, 443, 445, 446

(56) References Cited

U.S. PATENT DOCUMENTS

| 4,768,602 A | * | 9/1988 | Inoue et al. ............... 180/415 |
| 4,874,054 A | * | 10/1989 | Watanabe .................. 180/414 |
| 4,958,698 A | * | 9/1990 | Kirschner .................. 180/408 |
| 5,014,802 A | * | 5/1991 | Knoll et al. ................. 180/408 |
| 5,019,982 A | * | 5/1991 | Furukawa .................... 701/41 |
| 5,189,616 A | * | 2/1993 | Tsurumiya et al. ........... 701/41 |
| 5,208,751 A | * | 5/1993 | Berkefeld .................... 701/41 |
| 5,430,650 A | * | 7/1995 | Susuki et al. ................. 701/42 |
| 5,615,117 A | * | 3/1997 | Serizawa ..................... 701/42 |
| 5,627,754 A | * | 5/1997 | Asanuma et al. ............. 701/41 |

* cited by examiner

Primary Examiner—Gary Chin
(74) Attorney, Agent, or Firm—Kathryn A. Marra

(57) ABSTRACT

A method is disclosed for controlling the rear wheel angle in a four-wheel steering vehicle such as a pickup truck. The front wheels are steered using the conventional operator handwheel linked to the front wheels. The rear wheels are actuated with a reversible electric motor and the rear wheel angle controlled using a computer with inputs of vehicle velocity, operator handwheel position and correlated front wheel angle, and handwheel turning rate. Control of rear wheel angle starts with a correlation of ratios of rear wheel angle to front wheel angle, R/F, vs. vehicle velocity suitable, determined under steady state front steering angle and velocity conditions, to maximize the contribution of the rear wheels while avoiding side-slip of the vehicle. It is found that driver steering feel and vehicle maneuverability is improved by imposing a minimum front wheel angle requirement before rear wheel steering is permitted and by modifying the current value of R/F with gain factors base d on the hand wheel angle and rate of motion.

14 Claims, 8 Drawing Sheets

REAR WHEEL STEERING CONTROL

TECHNICAL FIELD

This invention relates to four-wheel steering systems for automotive vehicles. More specifically, this invention relates to improvements in the determination of the rear wheel steering angle based on vehicle velocity, the magnitude of the front wheel angle and the rate of change of the front wheel angle.

BACKGROUND OF THE INVENTION

Front wheel steering has been used in automotive vehicles since their inception one hundred years ago. The steering system is a major system required for driver operation of the car or truck and control of the path of the vehicle over the ground. The driver uses a handwheel that turns a steering column. The column is typically connected through rack and pinion gear and additional mechanical linkage to the front wheels. The angle between the front wheel plane and the longitudinal axis of the vehicle is the front wheel angle or steering angle. This wheel angle is proportional to the rotational angle of the driver's handwheel. There is resistance to the turning of the steerable wheels in a vehicle and in the modern vehicle the driver's front wheel steering effort is usually assisted by a power steering system.

Some vehicles, especially pickup trucks, may be designed with a rear wheel steering system that compliments the front wheel steering system. Pickup trucks have a relatively long wheel base and wide track. They are used in situations requiring low speed maneuverability and high speed steering stability. It is possible to improve both requirements with four wheel steering. Since the vehicle operator cannot independently operate two steering systems, obviously, the front and rear wheel steering systems must be coordinated. While at one time in the development of automotive vehicles there may have been mechanical systems that permitted four-wheel steering, the modern vehicle utilizes electronic control systems.

In a typical rear wheel steering system, an actuator independent of the driver action is provided to steer the rear wheels. For example, an electric motor is used as prime mover to drive a tie rod connected to the control arm of the steerable rear wheels, similar to the design of a typical electric power steering for front wheel steering systems. The control of the rear wheel steering is based on information from a position sensor on the steering column continually reporting the driver handwheel angle, and sensors on the wheels of the vehicle for continual determination of vehicle speed (i.e., velocity, in kilometers per hour, kph). An electronic controller is used to continually control the operation of a rear wheel steering actuator based on present inputs of the front wheel steering angle and vehicle speed. The controller reads the operator's handwheel position sensor, and determines the amount of vehicle front wheel steer by dividing the handwheel position with the fixed steering gear reduction ratio that typically ranges from about 14 to 18.

When the front wheel angle is zero, the rear wheel angle will also be zero, usually regardless of vehicle speed. But when the front wheel is being turned at a particular vehicle speed, usually the rear wheels are also to be turned in a manner that supports the drivers turning effort. The issue is how to convert the driver's front wheel steering and vehicle velocity commands to a suitable rear wheel angle steering command.

At the present state of the art, the practice is to predetermine suitable rear wheel to front wheel steering ratios, R/F, over the range of operating velocities for the vehicle. These R/F vs. velocity values, or processes for calculating them, are stored in the electronic database of the controller. During each steering control cycle, the controller looks up or calculates the appropriate R/F ratio for current vehicle velocity and multiplies it by the present front wheel angle to determine the new rear wheel angle command.

The R/F value is sometimes called the rear wheel angle to front wheel angle "gain." The present methods of establishing gain values are based on the physical characteristics of the vehicle. And the gain values are set so as to achieve predetermined goals in vehicle handling performance. At relatively low vehicle speeds the rear wheel angle is set opposite to the front wheel angle to permit a smaller turning radius and at higher vehicle speeds the rear wheel angle is in the same direction as the front wheel angle for vehicle stability. The gain values are typically determined for steady state front wheel angles and vehicle velocities. They are based on the maximum rear wheel angle for current speed and front wheel angle to achieve minimum side-slip motion, or skidding, under most driving conditions. Gain values can be determined experimentally or using computer models of vehicle dynamics based on the design characteristics of the vehicle. Relevant vehicle physical characteristics include, for example, mass (sprung and unsprung), location of center of gravity, wheel-base, track (i.e., the lateral distance between wheels), and yaw constants.

FIG. 2 shows typical curves of the R/F ratio vs. vehicle velocity for a half-ton capacity pick-up truck, with and without the use of a trailer. It is seen in FIG. 2 that a portion of each curve displays negative gain, and a portion displays positive gain values. Each R/F ratio curve has one point crossing the axis of the vehicle speed, resulting in a zero gain at a certain value of vehicle speed. Only at that particular vehicle speed will the vehicle equipped with rear-wheel steering system behave like a regular two-wheel steer (2WS) vehicle. When the vehicle is further equipped with a trailer mode selection switch, the controller can determine which curve to use based on the input from such switch.

The state-of-the-art control of the rear wheel steering angle has the objectives to enhance the vehicle maneuverability at low speed and vehicle stability at high speed. These objectives can be achieved by a control methodology based on the physical characteristics of the vehicle. The practice is to steer the rear wheel to an opposite direction of the front wheel at low speed (so-called "out-of-phase" steering), and steering the rear wheel to the same direction of the front wheel at high speed (so-called "in-phase steering"). Thus, at the present state of development, the amount of rear wheel steering is strictly dependent on the vehicle speed and the front wheel steer angle. The latter values are continually being sensed and the former value continually determined in open-loop calculation mode by the rear steering controller using predetermined R/F gain values.

Although it has been recognized that the rear wheel steering system under this state-of-the-art control can achieve the desired goals of vehicle maneuverability and stability, there are other issues related to driver's feel that need to be addressed while attempting to achieve those goals. These issues include the on-center steering feel, the driver-induced lateral motion during transient maneuvers, and driver's feel during usual straight-ahead driving at normal speeds. It is to be remembered that the only driving experience of most drivers is with front wheel steered vehicles. If the advantages of four wheel steering are to be realized on large pickup trucks and the like, operators must recognize and be comfortable with the handling of the vehicle as they try to steer it. It is a purpose of this invention to improve the state-of-the-art rear wheel steering control methodology for an enhanced driver's feel under various conditions as well as for a certain degree of vehicle stability enhancement described below.

SUMMARY OF THE INVENTION

This invention provides three related improvements of rear-wheel steering control. The improvements are adjustments that are made to the basic R/F gain table used by the rear wheel steering controller in determining the rear wheel steering angle in response to input data of present front wheel angle and vehicle velocity. The first improvement is a deadband function which relates to minimizing rear wheel steering at low front wheel steering angles regardless of vehicle speed. The second improvement is a steering motion multiplier which modifies the rear wheel steering angle depending upon how fast the operator is turning the handwheel. The third improvement is a nonlinear gain multiplier which relates to adjusting the new rear wheel steering angle command depending upon the magnitude of the present front wheel angle.

The first improvement is based on the fact that much of normal driving is in a generally straight-ahead direction and only small driver handwheel corrections are required. The driver may be continually making small front wheel steering corrections. But in these circumstances no rear wheel steering assistance may be required even though the predetermined R/F gain values in the steering controller may provide for it. Accordingly, the first improvement comprises identifying such low front wheel steering angles before any rear wheel steering command is issued. The practice is termed imposing a "deadband function" to the process of using the operator handwheel position signal to initiate a rear wheel steering command. This deadband function is applied to the handwheel position signal before the signal is used for determining the amount of rear-wheel steering.

The purpose of this deadband function process is to preserve the vehicle on-center steering feel for the operator. The on-center steering feel relates to driver's correlation between the handwheel torque and vehicle lateral acceleration when a small amount of steering action is taking place while driving straight ahead. The term "on-center" refers to the fact that the operator's handwheel is generally "centered," meaning positioned at, or cycling closely around, zero degree. The consistency of such feel is one of the factors determining the quality of a steering system, and great amount of engineering effort is used to make sure a base vehicle has as good an on-center feel as it could do within the constraint of engineering and manufacturing cost. However, when rear-wheel steering is activated, it changes the amount of vehicle lateral acceleration given the same handwheel steering torque. As the R/F ratio varies over the speed range of vehicle operation, the amount of lateral acceleration caused by rear steering also varies. This can result in inconsistent on-center feel. Although it is absolutely unrelated to vehicle safety, the familiar feel of steering system, based on front wheel steering, is compromised.

The deadband function of this invention improves the vehicle on-center feel by not responding to the handwheel steering input when it is within a small range where on-center feel is critical. Such range is typically small, for example, five to ten degrees rotation of the handwheel position from zero front wheel steering angle. This, of course, amounts to a much smaller front wheel angle based on a typical 1/16 ratio between hand wheel turning angle and the resulting front wheel angle. The breadth of the deadband range can also be made as a function of vehicle speed. With such deadband function, the on-center steering feeling is better preserved without compromise of the rear-wheel steering for the purpose of vehicle low-speed maneuverability and high-speed stability.

The second improvement is the incorporation of a steering motion multiplier to the R/F ratio of rear-wheel steering control gain. In accordance with this aspect of the invention, once the R/F ratio is identified for current vehicle velocity from the controller look-up table, it is further multiplied by a suitable steering motion coefficient. To obtain the steering motion multiplier, vehicle steering motion must be first detected, and its degree of motion determined. This can be implemented in the rear wheel steering controller by processing the handwheel position information. One way of determining the steering motion is to detect the rate of motion of the handwheel by taking its time derivative. This value of the rate of change of the driver produced front steering angle is used to adjust the newly determined rear wheel angle.

The purpose of this improvement is to further enhance driver handling perceptions and vehicle stability beyond the benefits inherent in rear wheel steering using only the predetermined basic, steady state operation, R/F gain values. To maximize its effect, this gain may be further implemented as a function of vehicle speed. A speed-dependent implementation of this steering motion multiplier gain is illustrated in FIG. 8B. At a relatively low rate of steering motion the steering motion gain value is one and no further modification is made to the R/F gain. However, at low vehicle speed, 16 kph, and increasing handwheel turning rate, the steering motion multiplier becomes smaller and, accordingly, reduces the rear wheel steering angle under these steering conditions. Likewise, while at a higher vehicle speed, 120 kph, the steering motion multiplier also decreases but at a lower rate.

The third improvement is the incorporation of a nonlinear gain multiplier based on the current front wheel steering angle. Thus, with this improvement, the basic R/F ratio is further multiplied by a gain which is a function of handwheel angle position. This nonlinear gain multiplier has a relatively smaller value (i.e., less than 1.0) at a smaller handwheel angle, and reaches the value of 1.0 after a threshold handangle determined by vehicle performance requirement. FIG. 8A illustrates a typical implementation of this nonlinear gain multiplier. The purpose of this nonlinear gain multiplier is to maintain vehicle stability in high speed while maintaining a similar driving feel a driver is used to driving a regular 2-wheel-steer vehicle under the similar driving situation.

The incorporation of these process improvements in the operation of the rear wheel steering angle controller markedly improves the performance of driver and vehicle in actual driving situations. During driving with small front wheel steering corrections, rear wheel steering is minimized to preserve the driver's on-center steering feel. And during times of sudden and/or substantial front wheel steering, the contribution of rear wheel steering is coordinated to help keep the driver in his/her two wheel steering feel comfort zone. The result is that the advantages of four wheel steering are preserved and better utilized by the driver in maneuvering large vehicles like pickup trucks with or without trailers.

Other objects and advantages of the invention will become more apparent from a detailed description of preferred embodiments that follows.

DESCRIPTION OF THE PREFERRED EMBODIMENT

Figure 1:
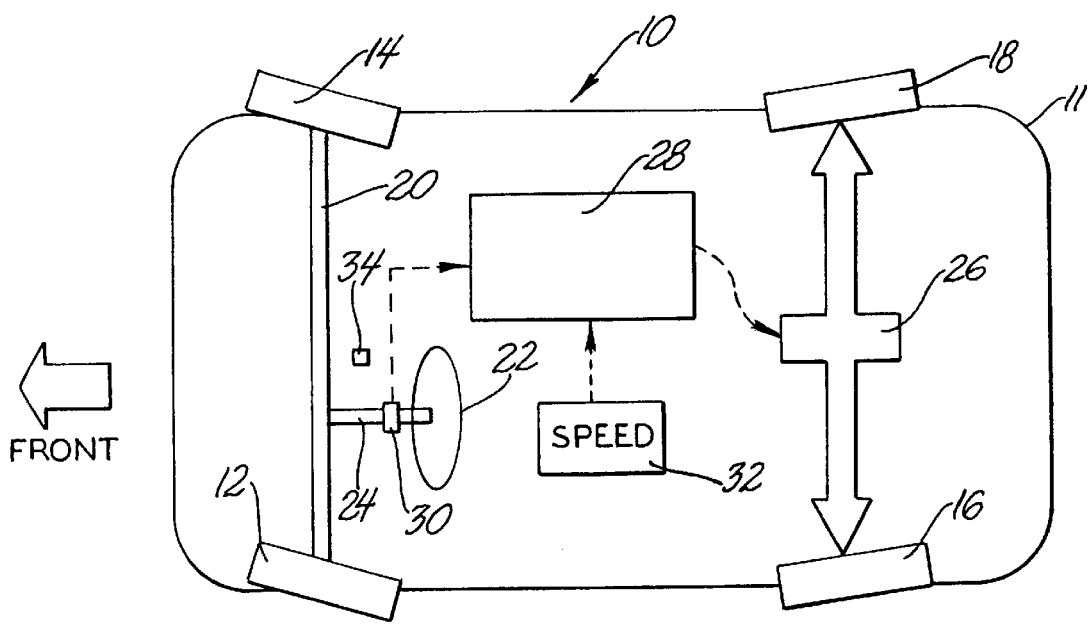
FIG. 1 is a schematic drawing of a four wheel steering system of an automotive vehicle such as a pickup truck.

A schematic illustration of the mechanical elements of a vehicle four-wheel steering system is presented in FIG. 1. Steering system 10 is of a type that could, for example, be used on a half ton or one ton capacity pickup truck 11. The truck 11 can be adapted for pulling a trailer. Steering system 10 includes left front wheel 12, right front wheel 14, left rear wheel 16 and right rear wheel 18. The front wheels 12, 14 are steered together as can be accomplished using known gear and linkage mechanisms with power steering assistance. The wheels 12, 14 are connected by a tie rod 20 attached to the control arms (not shown) of the wheels. The vehicle operator steers the front wheels 12, 14 using a handwheel 22 attached to steering column 24. Steering column 24 is connected to tie rod 20 through a hydraulic or electrical steering enhancing system, not shown.

Rear wheel steering mechanisms are also known. A typical system, indicated schematically at 26, comprises a reversible electrical motor drive that actuates a tie rod connected at each end to control arms on rear wheels 16 and 18. But the steering of the rear wheels is not under the direct control of the vehicle operator. A computer based rear wheel steering controller 28 is used. The controller 28 continually receives data concerning the position of the handwheel 22 from a handwheel angle sensor 30 on the steering column 24. The controller also continually receives vehicle speed data 32 from velocity sensors on the wheels and through related systems used to manage vehicle braking and traction operations.

The rear wheel steering controller 28 has been operated in open-loop control mode by using vehicle speed, V, and front wheel steering angle, $\delta_r$, to prompt the electric motor for rear wheel steering to properly position the rear wheels. The steering angle of front wheels 12 and 14 is the angle between the planes of the wheels and the longitudinal axis of the vehicle. There is a fixed ratio of the measured handwheel angle and $\delta_f$ which is a function of the gear ratio of the front wheel steering mechanism. The ratio is typically in the range of about 14–18 degrees of handwheel rotation per degree of turning of the front wheels. The front wheel angle, $\delta_f$, is arbitrarily treated as positive or negative depending, e.g., whether the wheels are turned to the right or left. The maximum value of $\delta_f$ is a function of the steering mechanism and is typically about plus or minus 35°.

The driver is also provided with a trailer mode selection switch 34 to advise the controller 28 when the vehicle is being used to pull a trailer.

Figure 2:
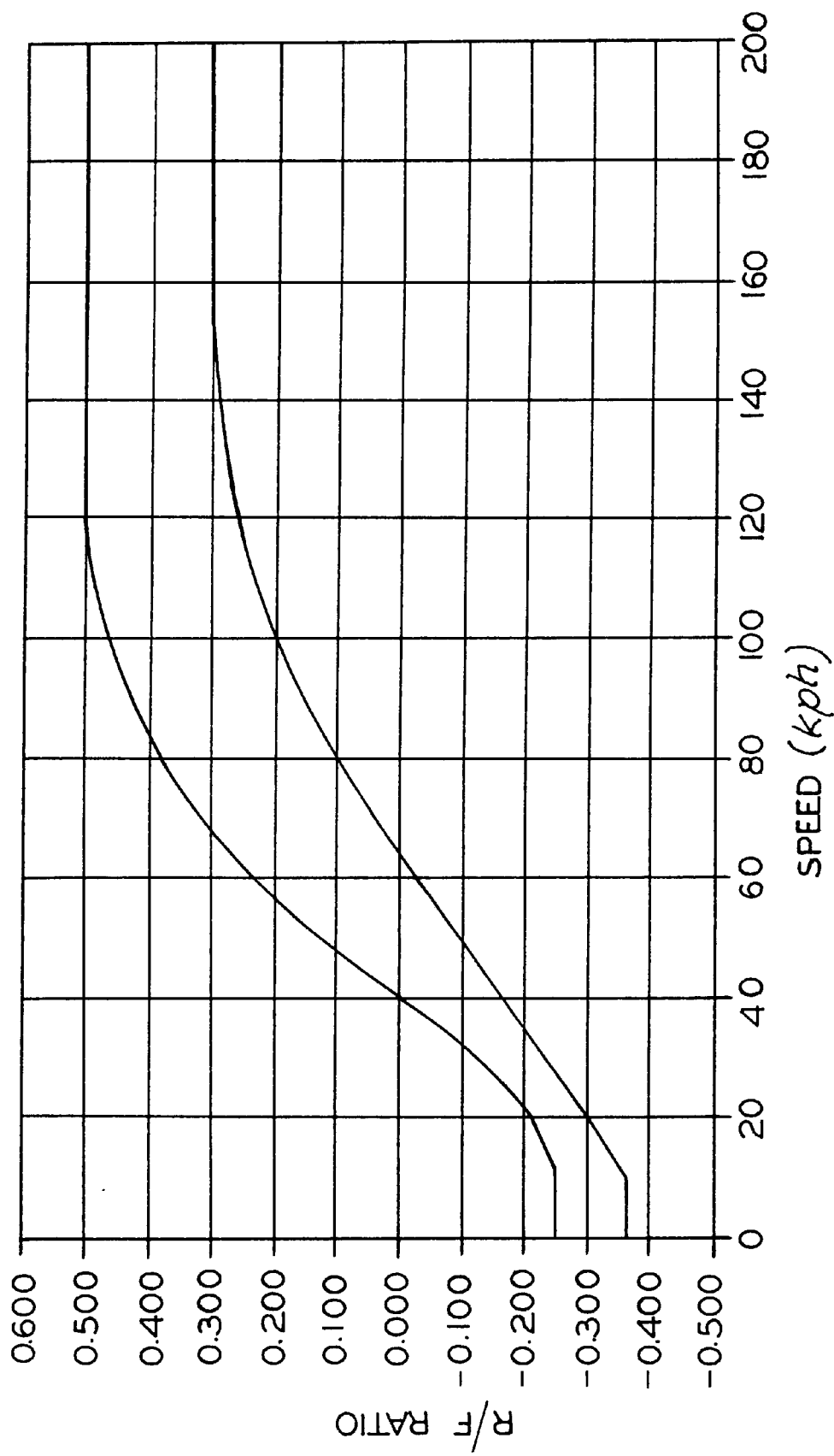
FIG. 2 is a graph of the ratio of rear wheel angle to front wheel angle (R/F) vs. vehicle speed in kilometers per hour for a pickup truck.

FIG. 2 is a graph of a predetermined relationship of rear wheel steering angle to front wheel angle at various vehicle velocities for a pickup truck. The R/F values were determined for the pickup truck itself, curve 40, and in a trailering mode, curve 42. These values were determined for a pickup truck having a nominal hauling capacity of one-half ton. The vehicle had the following characteristics relevant to its turning properties: front cornering stiffness, 69082 N/rad; rear cornering stiffness, 92512 N/rad; center of gravity to front axle, 1.378 m; center of gravity to rear axle, 2.278 m; maximum payload, 600 Kg; front track, 1.651 m; rear track, 1.676 m; sprung mass yaw inertia, 4597 Kg-m$^2$; sprung mass 1975.48 Kg; front unsprung mass, 148.86 Kg, rear unsprung mass, 194.39 Kg; total mass, 2318.73 Kg; and total yaw inertia, 5888 Kg-m$^2$.

The data for the trailering mode was prepared for a four wheel, sixteen foot long trailer.

The R/F values of curves 40 and 42 were determined experimentally at steady state front wheel turning angles and vehicle velocities on normal pavement to determine the maximum corresponding rear wheel angle without experiencing appreciable vehicle side-slip or skidding.

Curve 40 of FIG. 2 depicts R/F values from low truck speed to speeds in excess of 160 kph for truck operation without a trailer. At speeds below about 65 kph, truck maneuverability is enhanced by turning the rear wheels in a direction opposite to the turning direction of the front wheels. This mode of rear wheel steering control is known as out-of-phase steering and is indicated by negative values of R/F in curve 40 for speeds up to 65 kph. The ratio is −0.360 for speeds up to 10 kph and it then steadily decreases in absolute value. At about 65 kph, it is seen that R/F is zero and at higher speeds R/F has positive values (in-phase steering mode) gradually increasing to 0.300. The maximum rear wheel steer angle is fixed by vehicle design and is typically about plus or minus twelve degrees. Curve 42 is for the truck in a trailering mode of operation. Curve 42 is shifted to the left as compared with curve 40. The R/F values in the trailering mode have smaller absolute values during out-of-phase steering and greater values in in-phase steering. Predetermined R/F data like that contained in curves 40 and 42 is preferably stored as lookup tables in the memory of controller 28 and serves in the determination of the rear wheel steering angle.

Figure 3:
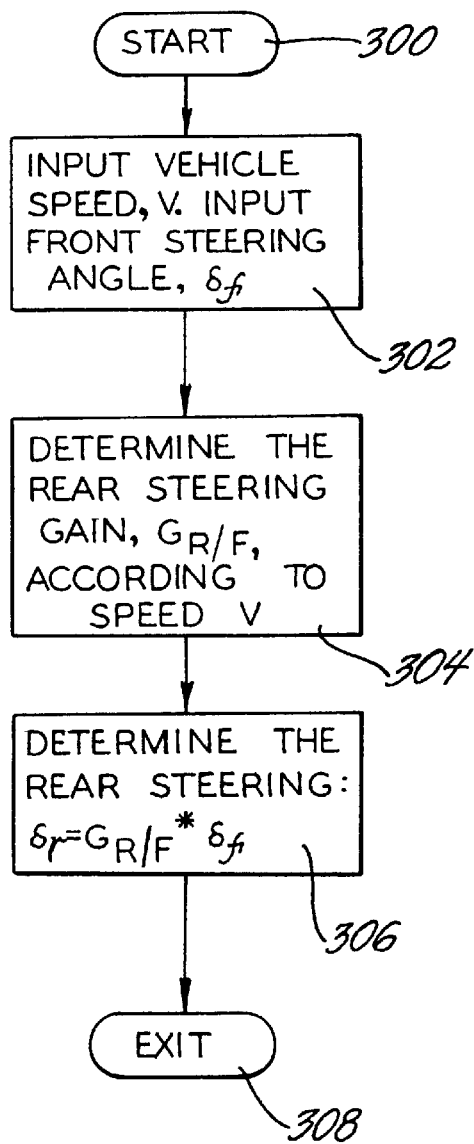
FIG. 3 is a flow diagram of an open-loop computer controlled process for determining a suitable rear wheel steering angle based on the current (input) front wheel steering angle and vehicle speed.

FIG. 3 is a process flow diagram illustrating open-loop rear wheel control using a controller 28. At the start of each controller cycle, block 300, typically about each 10 milliseconds, the controller 28 reads the current vehicle velocity, V, and front steering angle, $\delta_f$, block 302. The value of $\delta_f$ is zero or positive or negative depending upon whether the angle is to the right or left. Using these input parameters, the controller determines the corresponding value of rear steering gain, $G_{R/F}$, by referring to a lookup table of predetermined R/F values like those in the graph of FIG. 2, block 304. The value of current vehicle velocity is used to enter the table. The value of $G_{R/F}$ may be positive or negative with respect to the front steering angle, and the value of $G_{R/F}$ is always considerably less than one. The open-loop process then proceeds to block 306 where it computes the rear steering angle by multiplying the front steering angle by the rear steering gain value, i.e., $\delta_r = G_{R/F} * \delta_f$. However, if the front wheel angle is zero, the rear wheel angle is set to zero independent of this process.

The current processing cycle is thus completed, block 308. Then controller uses the new value of $\delta_r$ to adjust the rear wheel angle through the electric motor steering actuator with the change in direction also indicated. The open-loop process illustrated in FIG. 3 is repeated several times per second to detect and respond to changes in the front wheel angle. This open-loop process will suitably control the rear wheel direction in a four-wheel steering vehicle. However, as stated above, the R/F gain vs. velocity data and curve (FIG. 2) is predetermined with vehicle stability and maneuverability in mind. And the process illustrated in FIG. 3 uses only R/F gain data obtained in steady state front wheel/vehicle velocity tests or simulations. It would be very useful to add process steps to the FIG. 3 process to improve, for example, the steering feel of the vehicle from the perspective of the driver. Hence, additional processing steps are included in the rear wheel steering control for such purposes.

Figure 4:
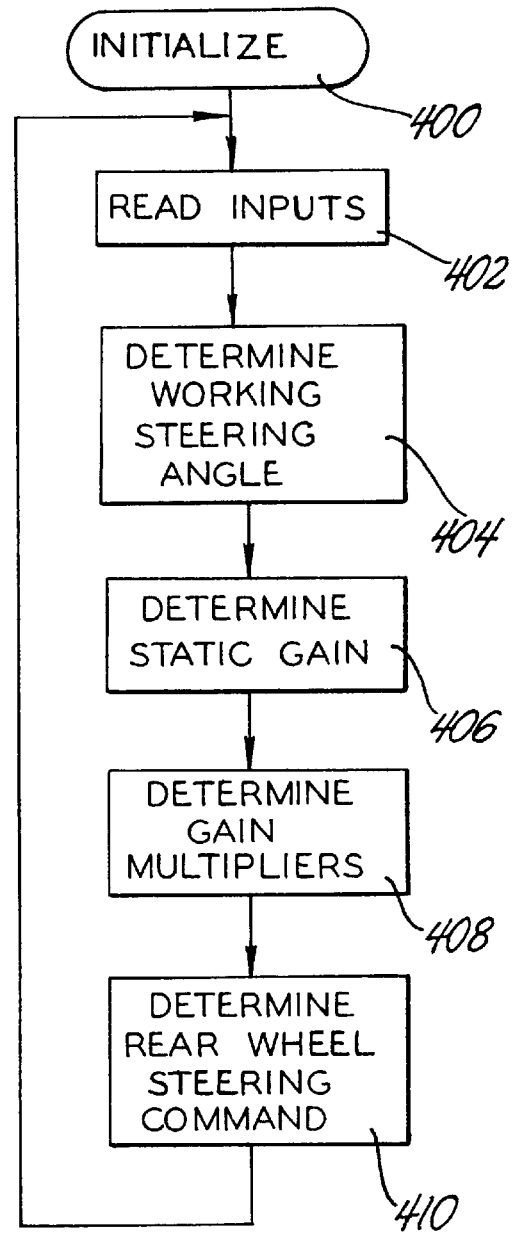
FIG. 4 is a summary process flow diagram for the practice of this invention on a suitably programmed rear wheel steering controller computer.

FIG. 4 is a process flow diagram in broad outline that modifies the FIG. 3 process to provide better operator steering feel. The process outlined in FIG. 4, and described in further detail with respect to FIGS. 5 through 9, is conducted on a suitably programmed computer as part of the rear wheel steering controller 28.

The controller is initialized, block 400, upon engine startup. The controller 28 reads current vehicle velocity and front wheel angle, block 402. However, before determining an appropriate rear wheel angle several intermediate steps are taken. Controller 28 first determines whether the absolute value of the front wheel angle is large enough to require rear wheel steering. This step is the application of the deadband function, block 404, and is illustrated in detail in FIG. 5. The output of the FIG. 5 process is either an acceptable large working front wheel angle or the determination that the small or zero front wheel angle requires no rear wheel steering assistance. Upon completion of the FIG. 5 deadband function step, the controller then retrieves a rear wheel angle gain factor, $G_{R/F}$, from a FIG. 2 lookup table. Of course, if $\delta_f$ is effectively zero, $G_{R/F}$ does not have to be obtained because rear wheel steering will not then be employed. But assuming a $\delta_f$ value of sufficient magnitude, the $G_{R/F}$ value retrieved, block 406, is now termed a static gain value because of gain multipliers that are to be applied to it, block 408. As stated in summary above, these gain multipliers are based on the current time rate of change of the front wheel angle and the current magnitude of the front wheel angle. The determination of such gain multipliers is further illustrated in FIGS. 6, 8A and 8B. The controller 28 applies the gain multipliers in determining a rear wheel steering command, block 410.

Figure 5:
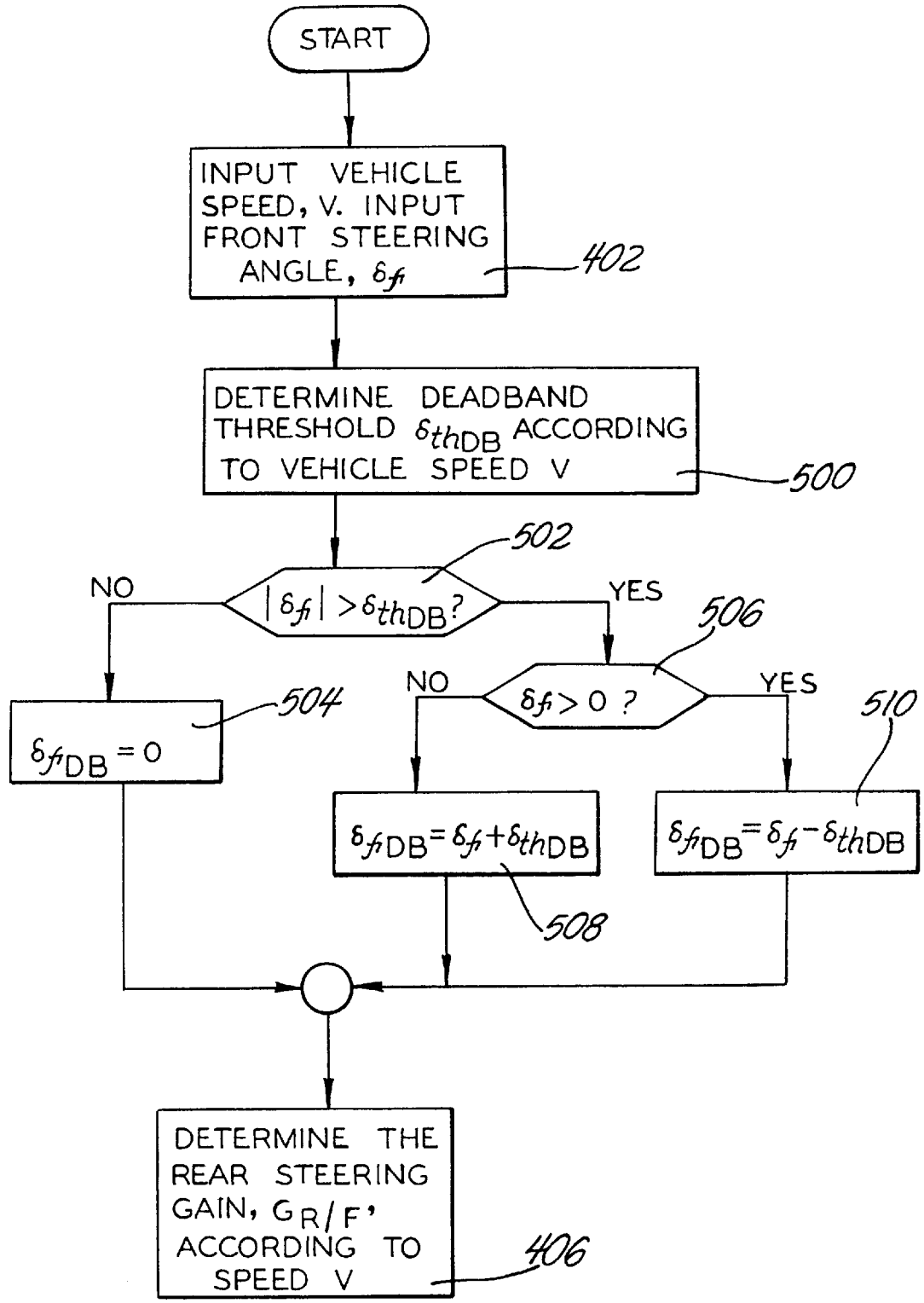
FIG. 5 is a summary process flow diagram for utilization of the deadband function of this invention.

FIG. 5 illustrates the deadband function step of the of block 404 (FIG. 4). After reading the current vehicle speed, V, and front steering angle, $\delta_f$, (block 402), controller commences determination of a deadband threshold $\delta_{thDB}$ for the front wheel angle according to current velocity, V (block 500). The deadband threshold value is determined by the controller by a practice illustrated in FIGS. 7A and &7B.

Figure 7A:
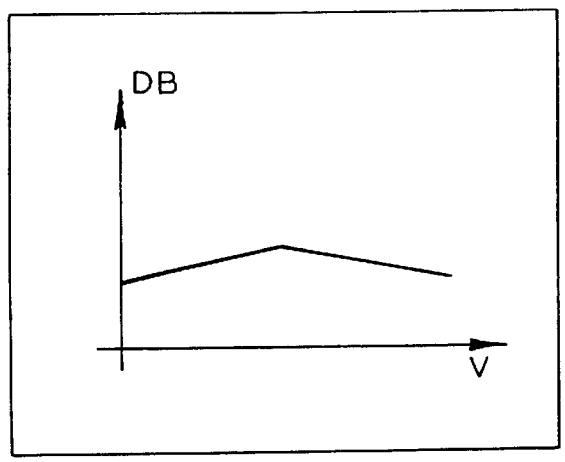
FIG. 7A is a graph of suitable deadband angles vs. vehicle velocity to be applied to front wheel steering angle inputs.

FIG. 7A schematically illustrates the relationship between a suitable deadband angle, DB, and vehicle velocity. These values are determined based on driver on-center steering perception based on vehicle speed. The values of DB correspond to very small front wheel angles that in turn correspond to small handwheel angles of about five to ten degrees. Typically, values of DB increase slightly over relatively low speeds to a maximum value at a moderate speed and then decrease with further increases in speed. In the example of the above characterized pickup truck, DB has a value of 0.3125 degrees (front wheel angle) at V=0 and increases linearly to 0.625 degrees at 56 kph. Above 56 kph the value of DB decreases linearly to 0.3125 degrees at 112 kph and remains at that value at higher speeds. The data of FIG. 7A is stored in the database of the steering controller for look up of a suitable value of a deadband angle, DB, which is applied as $\delta_{thDB}$ in block 500.

Figure 7B:
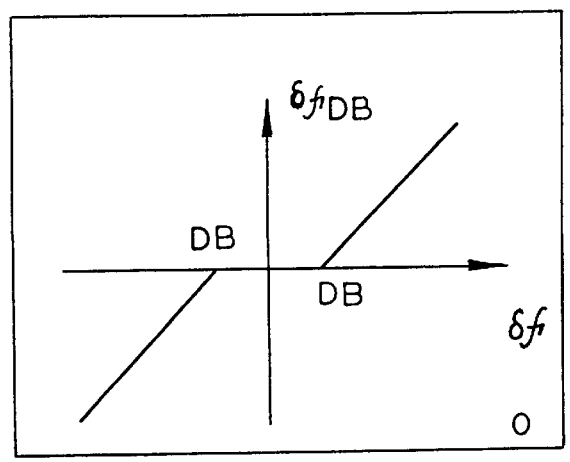
FIG. 7B is a graph illustrating the application of a selected deadband angle to an input value of front wheel angle, δf.

FIG. 7B schematically illustrates the application of a specific DB value to the current front wheel angle, $\delta_f$. The DB value is applied as $\delta_{thDB}$ in process blocks 502, 508 and 510 of FIG. 5. As will be seen below, the subtraction of $\delta_{thDB}$ effectively reduces the front wheel angle to zero at low front wheel angles, block 504, and reduces the value of larger front wheel angles, blocks 508 and 510.

In query block 502 the absolute value of the front wheel angle is compared with the predetermined value of $\delta_{thDB}$. The query: is $|\delta_f| > \delta_{thBD}$? If the answer in query block 502 is "no", the controller concludes that the effective front wheel angle is currently zero ($\delta_{fDB}=0$), block 504. If this situation reflects a straight-ahead driving situation, as opposed to a transient change of front wheel position, no rear wheel steering is applied. If the answer in query block 502 is "yes", the value of $\delta_f$ is to be reduced by the value of $\delta_{thDB}$. For this purpose the process proceeds to query block 506.

The purpose of query block 506 is to determine whether the front wheel angle is right (+) or left (−) and apply the $\delta_{thBD}$ function appropriately, blocks 508 (left) or 510 (right). Thus, the magnitude of the front wheel angle, $\delta_f$, is reduced by the threshold deadband value, $\delta_{thBD}$, and the reduced value of $\delta_f$ used to determine a suitable rear wheel angle.

Figure 6:
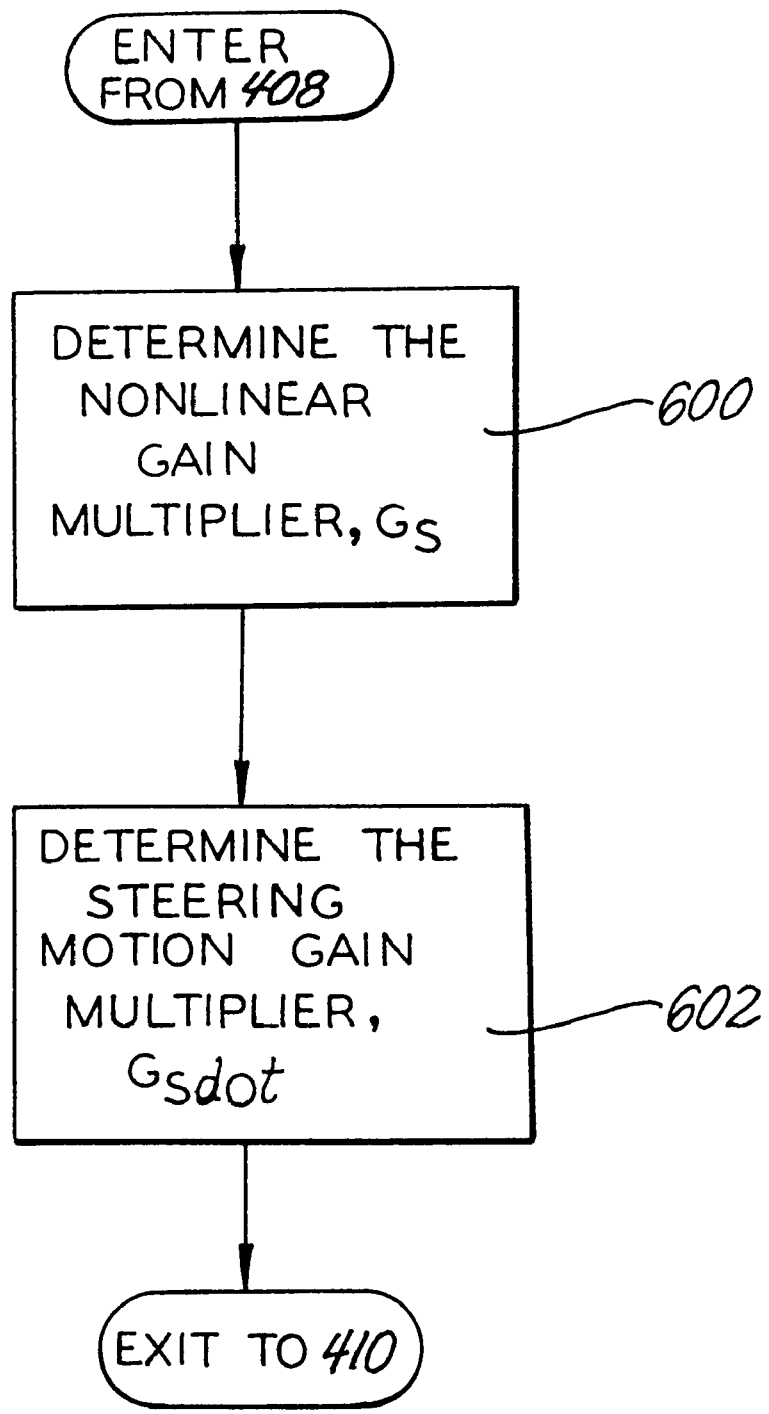
FIG. 6 is a process flow diagram for determining the gain multipliers utilized in the practice of this invention.
Figure 8A:
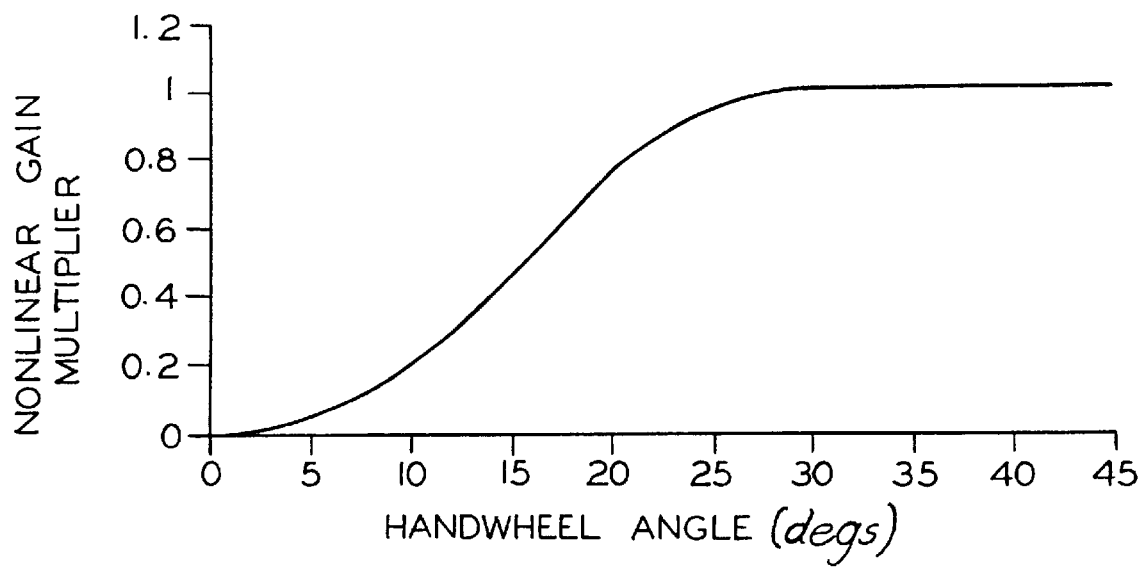
FIG. 8A is a graph of values of nonlinear gain multipliers, Gs, vs. handwheel angles in degrees.
Figure 8B:
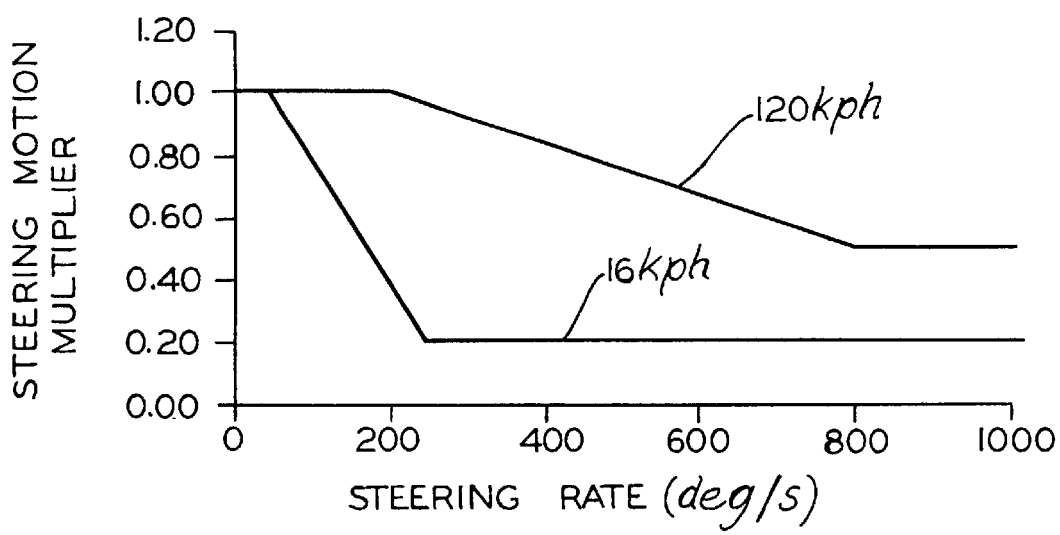
FIG. 8B is a graph of steering motion multiplier values, Gsdot, vs. rate of handwheel motion in degrees per second.

Having determined a value for $G_{R/F}$ in process block 406, the controller 28 proceeds to determine the gain multipliers as indicated in process block 408 as further illustrated in FIGS. 6 and 8(A) and 8(B). The process enters FIG. 6 from process block 408 and determines the nonlinear gain multiplier, Gs, block 600.

The nonlinear gain multiplier, Gs, is a function of the present handwheel angle which is read from sensor 30 or calculated from the front wheel angle whichever is directly measured. The current handwheel angle is used to enter a lookup table of predetermined nonlinear gain values, Gs, that are determined as a function of the hand wheel position. The selected gain value is multiplied by $G_{R/F}$ in the determination of the new rear wheel angle.

FIG. 8A illustrates a typical graph of nonlinear gain values plotted versus current handwheel position in degrees. These gain values, Gs, are determined for a specific vehicle and stored in a lookup table in the controller 28 database. It is seen in FIG. 8A that the nonlinear gain multiplier has a relatively smaller value (i.e., less than 1.0) at a smaller handwheel angle, and reaches the value of 1.0 after a certain angle determined by vehicle performance requirement. The purpose of this nonlinear gain multiplier is to maintain the contribution of rear steering to vehicle stability and maneuverability while better preserving driver steering feel.

The process then moves to block 602 for the determination of the steering motion gain multiplier, Gsdot. To obtain the steering motion multiplier, vehicle steering motion must be first detected, and its degree of motion determined. One way of determining the steering motion is to detect the rate of motion, s, of the handwheel by taking its time derivative. The value of sdot is calculated by the controller 28 using suitable previous handwheel positions and dividing by the elapsed time. The purpose of using Gsdot in determining rear wheel angle is to enhance the vehicle stability. To maximize its effect, this gain is preferably implemented as a function of vehicle speed.

FIG. 8B illustrates a speed-dependent implementation of this steering motion multiplier gain. Predetermined values of Gsdot at vehicle speeds of 16 kph and 120 kph are presented in graph form vs. rate of handwheel motion in deg/s. These values are determined experimentally with an experienced test driver or using a suitable computer model of vehicle handling characteristics. The purpose is to better adapt the use of the R/F gain values, which are largely based on vehicle physical dynamics and engineering dynamics data, to actual driver satisfaction and comfort in control of the vehicle. The R/F gain values were likely determined under steady state turning conditions. But the application of rear wheel steering when the front wheels are being turned rapidly may require modification of the R/F gain values for driver satisfaction and vehicle stability.

In implementation of the steering motion multiplier gain, it is preferred that at least two curves at different speeds be prepared. When curves are prepared for relatively low and high vehicle speeds, appropriate values at other turning rates and vehicle speeds can be determined by the rear wheel controller by interpolation or extrapolation.

It is seen that the value of Gsdot is one at low steering wheel turning rates regardless of vehicle speed. At 16 kph and higher handwheel turning rates the value of Gsdot decreases and then levels off at about 0.200. Thus, application of Gsdot at low vehicle speed and high handwheel turning rates produces a marked reduction in the rear wheel steering angle. Observation of the 120 kph curve in FIG. 8B shows that at higher vehicle speed, higher values of Gsdot are used by the controller and this steering motion multiplier has a smaller effect on the final rear wheel angle.

Figure 9:
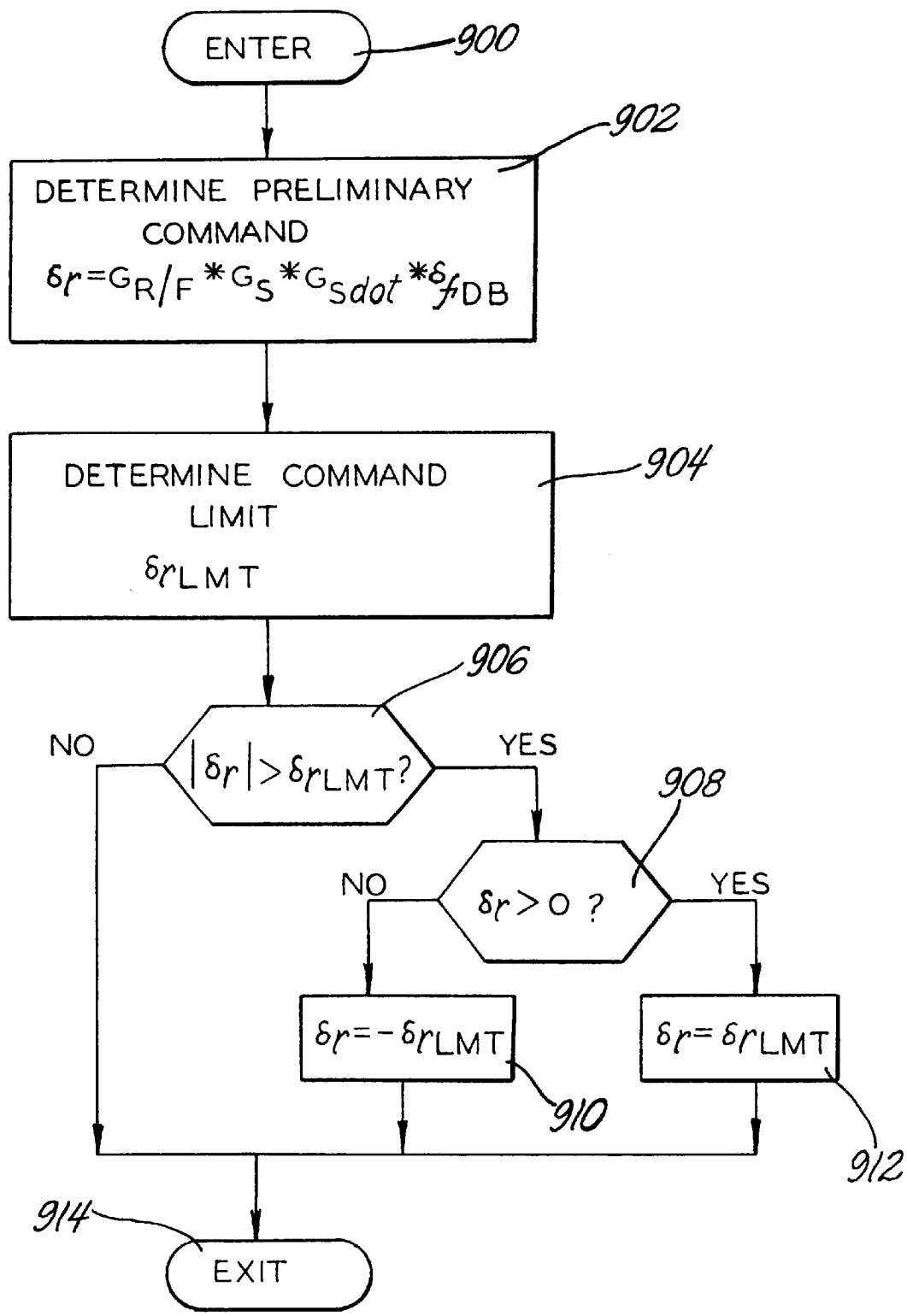
FIG. 9 is a process flow diagram for calculation rear wheel steer angle in accordance with a preferred embodiment of this invention.

Having determined both Gs and Gsdot, blocks 408, 600, 602, the controller 28 now determines the current rear wheel steering angle to command. The process moves to process block 410 and this step is further illustrated in FIG. 9. Referring to FIG. 9, the process enters from block 410 and proceeds to calculate a preliminary rear wheel steering angle, δr, block 902. This calculation starts with the value of the current front wheel angle as affected by the deadband function, $\delta_{fDB}$, and modifies it by multiplying it with the static gain factor, $G_{R/F}$, the nonlinear gain factor, Gs and the steering motion gain factor, Gsdot. As seen in block 902, the calculation is shown by the equation: $\delta r = \delta_{fDB} * G_{R/F} * Gs * Gsdot$.

Figure 10:
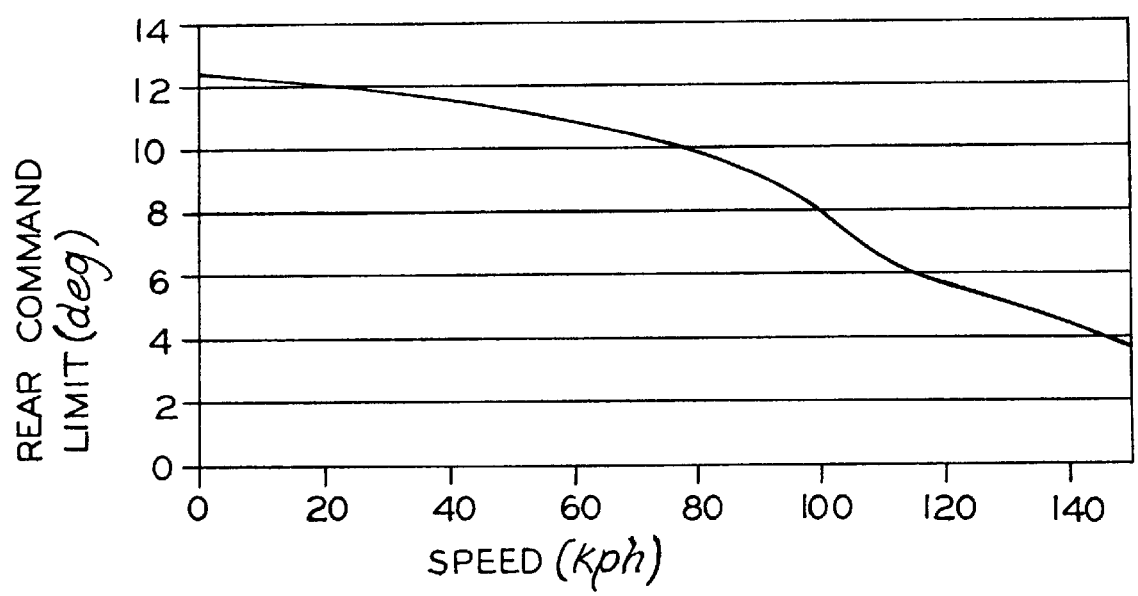
FIG. 10 is a graph of limiting rear wheel angles vs. vehicle speed for a pickup truck used in illustrating the practice of this invention.

Following the calculation of δr, the controller 28 then determines whether this rear wheel angle exceeds a limiting angle determined for the vehicle at the current vehicle speed, block 904. FIG. 10 is a graph of limiting rear wheel steering angles vs. vehicle speed in kph for the pickup truck of this illustration. The controller 28 uses current vehicle speed to enter a lookup table containing the data of FIG. 10 and retrieves the current rear wheel limiting angle, $\delta_{rLMT}$. The process moves to block 906 where the absolute value of δr (because this value may be + or − depending upon a left or right steering angle requirement) is compared with $\delta_{rLMT}$.

If the answer is "no", the preliminary rear wheel angle command, δr, is the accepted value and becomes the control rear steering angle for the current controller calculation cycle. If δr exceeds $\delta_{rLMT}$ ("yes" in block 906), the process checks whether δr is positive or negative, block 908 and applies the correct sign to $\delta_{rLMT}$, block 910 or 912, and $\delta_{rLMT}$ becomes the current rear wheel steer angle, block 914.

Thus, it is understood to those skilled in the art of vehicle dynamics that an out-of-phase steering at the rear wheel can enhance vehicle maneuverability at lower vehicle speeds, and an in-phase steering at the rear wheel can enhance vehicle stability at higher vehicle speeds. However, the effect of these types of steering does impact what the driver perceives during normal driving where maneuverability and stability are not at issue. With this invention, the driver will be able to keep substantially the same on-center steering feel when driving a vehicle equipped with rear-wheel steering. Furthermore, using this invention to further process the rear-wheel steering gain, any driving with normal degree of steering will no longer be perceived as unusual feel, yet the rear-wheel steer system will be able to provide the benefit of maneuverability and stability when so demanded by the driver.

While the invention has been described in terms of specific examples, it will be appreciated that other forms could readily be adapted by those skilled in the art. Accordingly, the scope of the invention is to be limited only by the following claims.

What is claimed is:

1. In the method of controlling the rear wheel angle in a vehicle having operator controlled front wheel steering using a front steering handwheel linked to the front wheels; and electronic controller managed, electrical actuator initiated rear wheel steering, said rear wheel steering being managed using a computer based controller in which continually repeated calculation cycles are performed; said method comprising determining the current front wheel angle, determining the current velocity of said vehicle and determining a rear wheel angle by multiplying said current front wheel angle with a value of a ratio of rear wheel angle to front wheel angle, termed R/F gain value, selected for said current vehicle velocity from a database of R/F gain values correlated with steady-state front wheel angles and corresponding steady state vehicle velocities for non side-slip vehicle maneuverability, the improvement in determining said rear wheel angle comprising, applying to said R/F gain value at least one predetermined gain factor based on at least one of (i) the magnitude of a current operator handwheel angle, (ii) the magnitude of said current front wheel angle and (iii) the current time rate of change of said operator handwheel angle.

2. In the improved method of rear wheel steering control recited in claim 1, the improvement further comprising comparing said current front wheel angle with a predetermined deadband value of front wheel angle and requiring said current front wheel angle to exceed said deadband value before said rear wheel steering is commanded.

3. In the improved method of rear wheel steering control recited in claim 1, the improvement comprising comparing said current front wheel angle with a predetermined deadband value of front wheel angle correlated with said vehicle velocity and requiring said current front wheel angle to exceed said predetermined deadband value before said rear wheel steering is commanded.

4. In the improved method of rear wheel steering control recited in claim 2 or 3, the improvement comprising subtracting said predetermined deadband value from the current front wheel angle, when the absolute value of said wheel angle is larger than said predetermined deadband value, and using the value of the difference in determining said rear steering angle.

5. In the improved method of rear wheel steering control recited in claim 1, the improvement further comprising determining the current time rate of change of operator handwheel angle and applying to said R/F gain value a predetermined gain factor correlated to said current time rate of change in the determination of said rear wheel angle.

6. In the improved method of rear wheel steering control recited in claim 5, the improvement comprising determining the time rate of change of operator handwheel angle and applying to said R/F gain value a predetermined gain factor correlated to said current time rate of change and said current vehicle velocity in the determination of said rear wheel angle.

7. In the improved method of rear wheel steering control recited in claim 1, the improvement comprising determining the magnitude of the op operator handwheel angle and applying to said R/F gain, value a predetermined gain factor correlated to said operator handwheel angle magnitude in the determination of said rear wheel angle.

8. A method of controlling the rear wheel angle in a four wheel steering vehicle having operator controlled front wheel steering using a front steering handwheel linked to the front wheels; an electrically responsive actuator linked to the rear wheels for affecting rear wheel steering; and a computer based, rear wheel steering angle controller for continually determining and supplying rear wheel steering angle commands to said actuator, said method being conducted by said controller in continually repeated control cycles and comprising determining the current front wheel angle, determining the current velocity of said vehicle, determining a value of a ratio of rear wheel angle to front wheel angle, termed R/F gain, selected for said current vehicle velocity from a predetermined compilation of R/F gain values correlated with steady-state front wheel angles and corresponding steady state vehicle velocities for non side-slip vehicle maneuverability, applying to said R/F gain value at least one predetermined gain factor based on at least one of (i) the magnitude of a current operator handwheel angle, (ii) the magnitude of said current front wheel angle and (iii) a current time rate of change of the operator handwheel angle, and calculating a new current rear wheel angle command for said actuator by multiplying said current front wheel angle by the product of said R/F gain value and said at least one predetermined gain factor.

9. A method of controlling the rear wheel steering angle in a four wheel steering vehicle as recited in claim 8 comprising comparing the current front wheel angle with a predetermined deadband value of front wheel angle and requiring said current front wheel angle to exceed said predetermined deadband value before said rear wheel steering is commanded.

10. A method of controlling the rear wheel steering angle in a four wheel steering vehicle as recited in claim 8 comprising comparing the current front wheel angle with a predetermined deadband value of front wheel angle correlated with vehicle velocity and requiring said current front wheel angle to exceed said predetermined deadband value before said rear wheel steering is commanded.

11. A method of controlling the rear wheel steering angle in a four wheel steering vehicle as recited in claim 9 or 10 comprising subtracting said predetermined deadband value from said current front wheel angle, when the absolute value of said current front wheel angle is larger than said predetermined deadband value and using the value of the subtraction in determining said rear steering angle.

12. A method of controlling the rear wheel steering angle in a four wheel steering vehicle as recited in claim 8 comprising determining the current time rate of change of operator handwheel angle and applying to said R/F gain value a predetermined gain factor correlated to said current time rate of change in the determination of said rear wheel angle.

13. A method of controlling the rear wheel steering angle in a four wheel steering vehicle as recited in claim 12 comprising determining the time rate of change of operator handwheel angle and applying to said R/F gain value a predetermined gain factor correlated to said current time rate of change and said current vehicle velocity in the determination of said rear wheel angle.

14. A method of controlling the rear wheel steering angle in a four wheel steering vehicle as recited in claim 8 comprising determining the magnitude of the operator handwheel angle and applying to said R/F gain value a predetermined gain factor correlated to said operator handwheel angle magnitude in the determination of said rear wheel angle.

* * * * *